US009338096B2

(12) United States Patent
Xu et al.

(10) Patent No.: US 9,338,096 B2
(45) Date of Patent: May 10, 2016

(54) MULTICAST TREE PACKING FOR MULTI-PARTY VIDEO CONFERENCING UNDER SDN ENVIRONMENT

(71) Applicant: Futurewei Technologies Inc., Plano, TX (US)

(72) Inventors: Yang Xu, Brooklyn, NY (US); Miao Zhao, Santa Clara, CA (US); Mingquan Wu, Princeton Junction, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 14 days.

(21) Appl. No.: 14/473,805

(22) Filed: Aug. 29, 2014

(65) Prior Publication Data

US 2015/0062285 A1     Mar. 5, 2015

Related U.S. Application Data

(60) Provisional application No. 61/872,187, filed on Aug. 30, 2013.

(51) Int. Cl.
| | |
|---|---|
| *H04L 12/803* | (2013.01) |
| *H04L 12/801* | (2013.01) |
| *H04L 12/18* | (2006.01) |
| *H04N 7/15* | (2006.01) |

(52) U.S. Cl.
CPC .......... *H04L 47/122* (2013.01); *H04L 12/1813* (2013.01); *H04L 12/1822* (2013.01); *H04L 47/15* (2013.01); *H04N 7/152* (2013.01)

(58) Field of Classification Search
None
See application file for complete search history.

(56) References Cited

U.S. PATENT DOCUMENTS

| | | | | |
|---|---|---|---|---|
| 2005/0013244 | A1* | 1/2005 | Parlos ................. | H04L 12/2602 370/229 |
| 2011/0002333 | A1* | 1/2011 | Karuppiah .......... | H04L 12/1836 370/390 |
| 2012/0218887 | A1* | 8/2012 | Khilnani ............. | H04L 43/0876 370/230 |
| 2013/0294236 | A1* | 11/2013 | Beheshti-Zavareh ... | H04L 47/22 370/235 |
| 2015/0222446 | A1* | 8/2015 | Suresh ................. | H04L 49/201 370/390 |

* cited by examiner

*Primary Examiner* — Fan Tsang
*Assistant Examiner* — Jeffrey Lytle
(74) *Attorney, Agent, or Firm* — Conley Rose, P.C.; Grant Rodolph; Brandt D. Howell (57) ABSTRACT

Method, device and apparatus for delivering video telephony by using a media controller and a software defined networking (SDN) controller to enable multicasting for multi-party video conferencing. A media controller generates a video sending rate for each of the plurality of client devices based on a received video conference request and received network information. The media controller determines and independently constructs a maximum-rate delay-bounded multicast tree for each of the plurality of client devices that supports the largest possible multicast rate. The media controller determines a common congested link in the multicast trees, re-routes the multicast tree with the common congested link for the client device with the lowest weight of utility divided by its video sending rate and creating two subtrees, and iteratively re-routes the multicast trees until an aggregate video sending rate of the multicast trees sharing the common congested link meets a link capacity of the common congested link.

14 Claims, 9 Drawing Sheets

MULTICAST TREE PACKING FOR MULTI-PARTY VIDEO CONFERENCING UNDER SDN ENVIRONMENT

CLAIM OF PRIORITY

This application claims priority of U.S. Provisional Patent Application Ser. No. 61/872,187, filed on Aug. 30, 2013, entitled "MULTICAST TREE PACKING FOR MULTI-PARTY VIDEO CONFERENCING UNDER SDN ENVIRONMENT" the teachings which are incorporated herein by reference.

TECHNICAL FIELD

The present disclosure relates generally to delivering high-quality video telephony to enable multicasting for multi-party video conferencing.

BACKGROUND

Video conferencing services, such as iChat, Google+, and Skype, have been getting increasingly popular on the Internet, which require high-bandwidth and low-delay video transmission between distributed users. More recently, with the proliferation of video-camera consumer devices and penetration of high-speed access networks, more and more communications between multiple users have triggered the popularity of multi-party functionality in video conferencing, which involves multiple participants in a same video session to facilitate realtime group interactions. Considering the quadratically-increased workload with the number of users in a multi-party conferencing system, how to make high quality video delivery to maximize system-wide user quality-of-experience (QoE) has become a very challenging problem.

Figure 1:
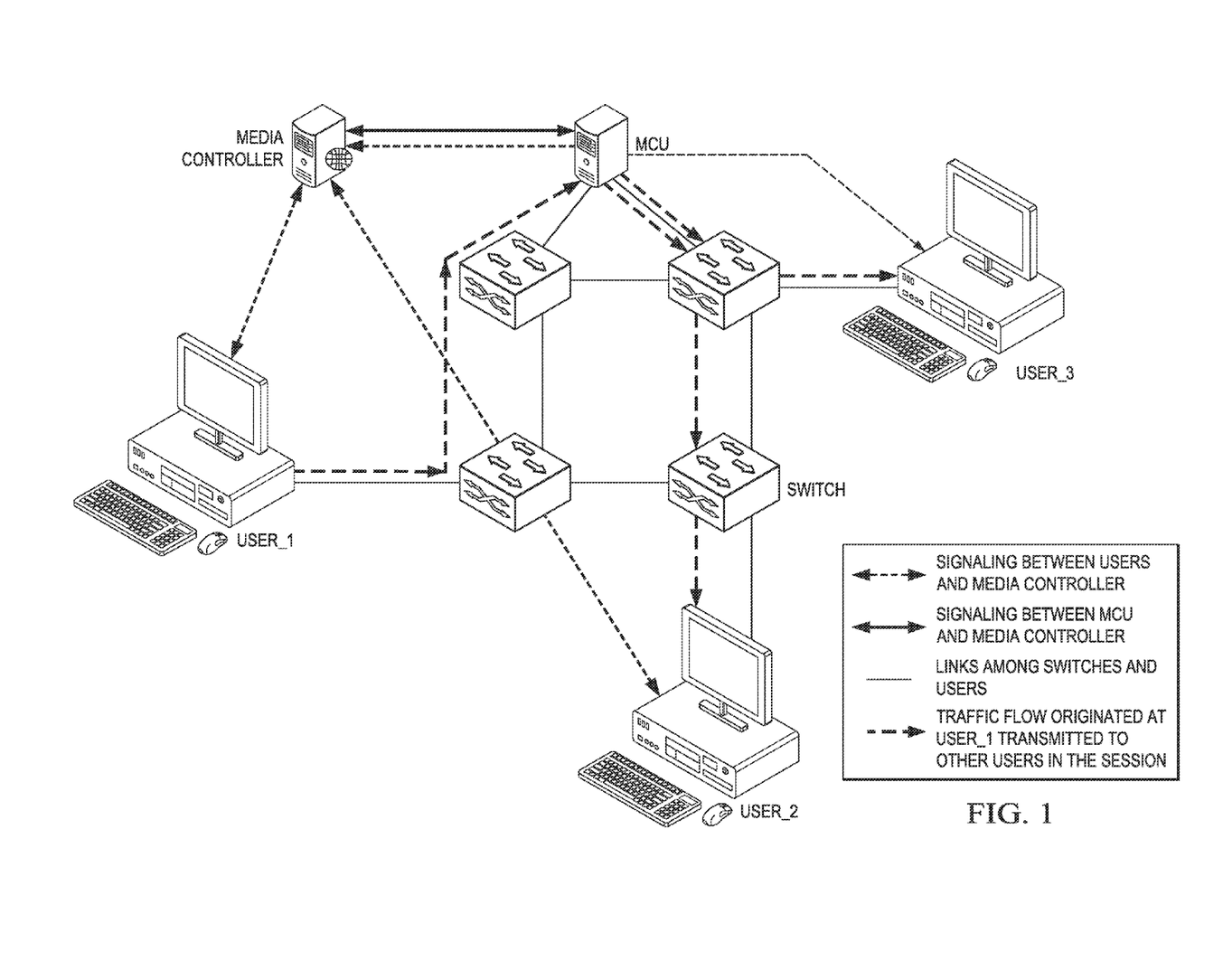
FIG. 1 illustrates a MCU-based solution for multi-party video conferencing systems.

A current commercially employed solution for a multi-party conferencing system is a multipoint control unit (MCU)-based approach. In this approach, each participant needs to send its video to the MCU first and the MCU may do the mixing function, and then send the video to the receivers along separate connections, as shown in FIG. 1. This approach is simple and easy to maintain user states. However, due to detouring to the MCU and the handling burden at the MCU, this process may cause large delays, a single point of failure, and a bottleneck for the entire communication session. For instance, if the location of the MCU is not set up well, the delay performance between end users could not be guaranteed. Since user QoE degrades significantly if a one-way end-to-end video delay goes over 300 milli-seconds, the results of this solution are still far from satisfactory for the realtime communication.

There is a need for multi-party video conferencing to deliver high-quality video telephony that can support a high data rate while guaranteeing a small bounded end-to-end delay.

SUMMARY

Method and apparatus for delivering video telephony by using a media controller and a software defined networking (SDN) controller to enable multicasting for multi-party video conferencing.

In one example embodiment, a method of multicast video telephony comprises receiving, at a media controller, video conference request from each of a plurality of client devices. The media controller receives network information from a network controller, and generates a video sending rate for each of the plurality of client devices, wherein the video sending rate is based on the received video conference request and the received network information.

In some embodiments, the network controller is a software defined networking (SDN) controller. The media controller determines a maximum-rate delay-bounded multicast tree for each of the plurality of client devices that supports the largest possible multicast rate. The media controller independently constructs the maximum-rate delay-bounded multicast tree for each of the plurality of client devices. The media controller determines a common congested link in the multicast trees, and re-routes the multicast tree with the common congested link for the client device with the lowest video sending rate divided by its weight of utility and creating two subtrees. The media controller then re-routes the multicast tree with the common congested link for the client device with the next lowest video sending rate divided by its weight of utility. The media controller iteratively re-routes the multicast trees with the common congested link until an aggregate video sending rate of the multicast trees sharing the common congested link meets a link capacity of the common congested link. The media controller may find another feasible link/path to replace the common congested link on the multicast trees such that a delay of each said multicast tree is still below a predetermined threshold.

In another example embodiment, a media controller is configured to perform the method above. In another example embodiment, a system is configured to perform the method above.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The present disclosure describes a method and apparatus to deliver high-quality video telephony to enable multicasting for multi-party video conferencing, such as by using technology of software defined networking (SDN).

In recent years, the technology of SDN has emerged, which allows network administrators to manage network services through abstraction of lower level functionality via decoupling the system that makes decisions about where traffic is sent (i.e., control plane) from the underlying systems that forwards traffic to the destination (i.e., data plane). The SDN controller is capable of collecting information from network devices and changing the setting of under-layer infrastructure for different traffic flows. Based on the full knowledge of a network condition, according to particular requirements of network services, the SDN controller can adaptively set up different routes for different flows so as to maximize service utility.

This disclosure takes advantage of SDN to provide multi-party conferencing system under a SDN context. To achieve both low-delay and high-bandwidth video delivery to multiple destinations, IP multicast is a straight-forward solution. Internet Group Management Protocol (IGMP) is a communication protocol used to manage multicast group membership between a host and its directly attached router. This protocol is designed assuming network control is fully distributed. However, it has drawbacks, such as that there is no control over who can send datagrams to the group members. In addition, senders cannot reserve addresses or prevent another sender from using the same address. The chaos in management results in rare deployment of IP multicast on current networks. However, the situation turns to be quite different when employing SDN, where the multicast groups can be centrally managed in one SDN controller and the flow route can only be set up with the authorization of the SDN controller. This makes IP multicast manageable and admission control easy to realize when using SDN.

The present disclosure provides an SDN-enabled IP multicast based solution for a multi-party video conferencing application. The management of the multicast based solution is centralized in SDN controllers and media controllers. The present disclosure also provides a novel multicast tree construction and packing method to maximize the system-wide utility under a guaranteed end-to-end delay. Simulation results show that the multicast solution of the present disclosure behaves better than the MCU-based approach.

System Overview

Basic Architecture and Interfaces.

In the following, details of the SDN-enabled IP multicast based solution are provided with reference to FIG. 2 and FIG. 3.

Figure 2:
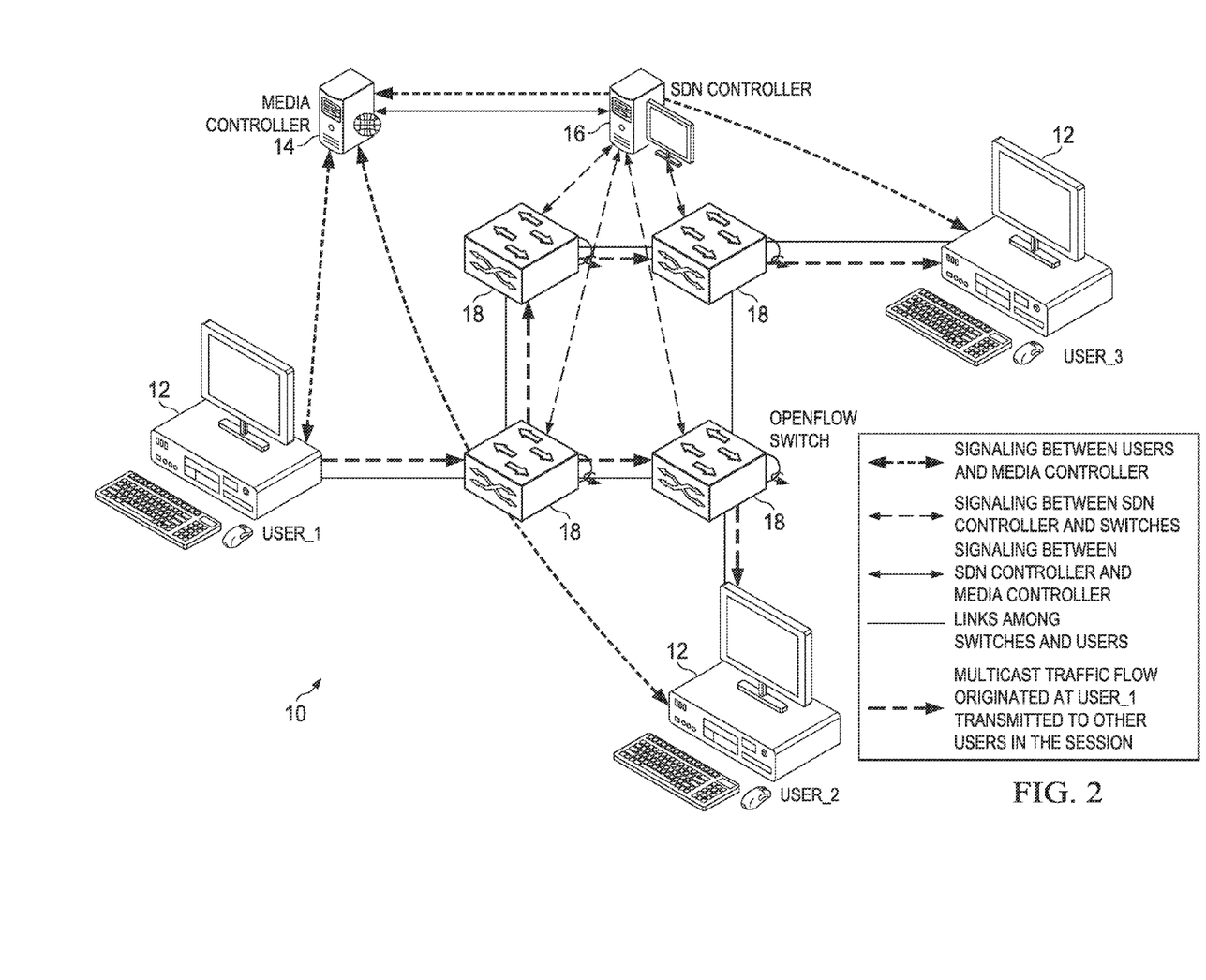
FIG. 2 illustrates control and data paths of a SDN-enabled multicast solution for multi-party video conferencing systems according to this disclosure.
Figure 3:
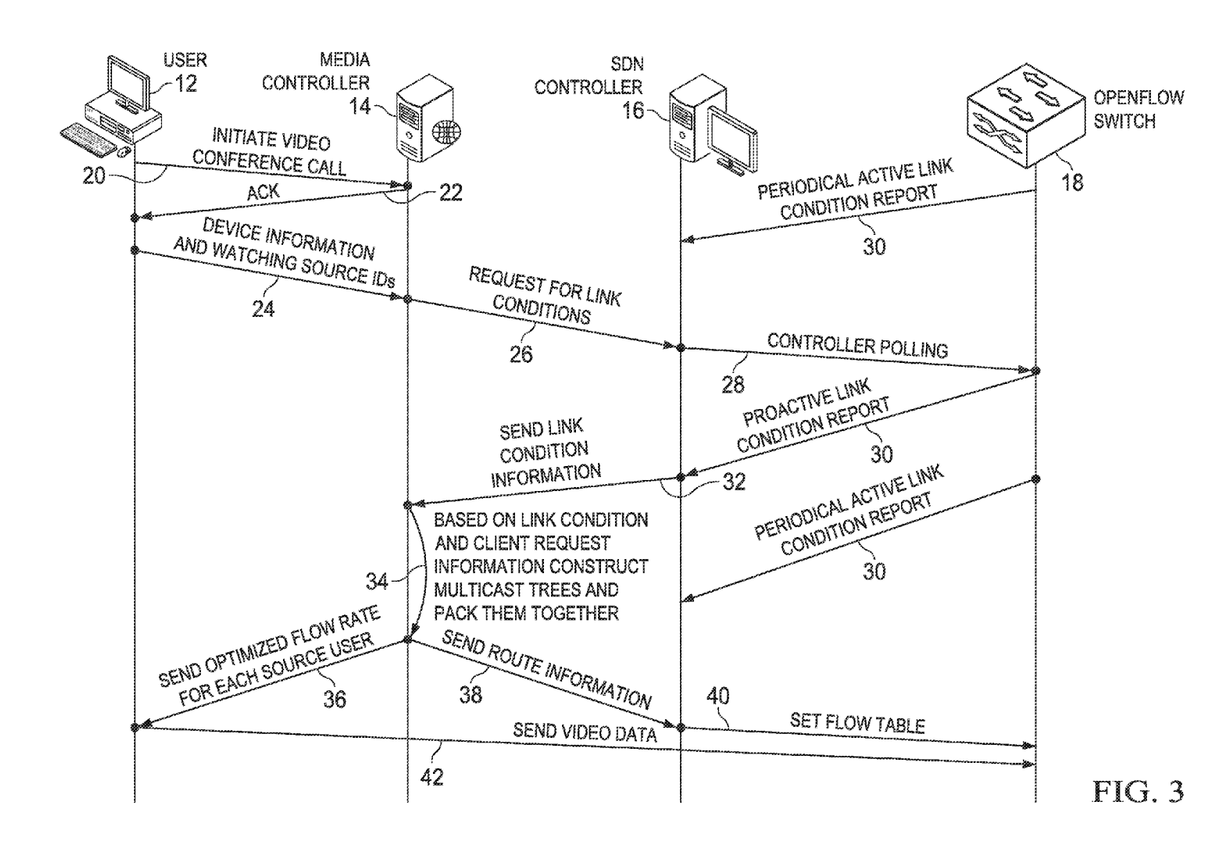
FIG. 3 illustrates interface exchanges between a SDN controller, a media controller, switches, and users.

FIG. 2 depicts a system architecture of a network 10, and FIG. 3 illustrates the interfaces between network components. In particular, when users 12 want to set up a video conference between each other, they first communicate with media controller 14 by sending the messages about which video sources they want to watch and their device information. In the meantime, since the SDN controller 16 can communicate with edge switches 18 in the network 10, the SDN controller 16 can obtain the whole picture of the network 10, including network topology, link bandwidth and link delay.

There are at least two modes for the SDN controller 16 to gather the network information. One is periodical active reporting by the switches 18, and the other is a proactive report by the switches 18 in response to receiving a polling message from the SDN controller. The SDN controller 16 then sends link condition information to the media controller 14. Using the whole network picture and video watching relationship, the media controller 14 executes a multicast tree construction and packing algorithm, which will be discussed hereafter, to calculate the flow route and decide the sending rate for each source user 12 in order to maximize the system-wide utility. Then, the media controller 14 notifies each source user 12 of its video rate and informs the SDN controller 16 the flow routes. After that, the SDN controller 16 correspondingly sets up flow tables in each switch 18. The IGMP is not needed to manage the multicast group. Instead, all the management work is done by media controller 14. Whenever the video watching relationship varies, users 12 will inform the media controller 14 to change the state of the multicast groups. Since the SDN controller 16 can itself communicate with switches 18 periodically, it will notify the media controller 14 to recalculate flow routes and video rates instantly whenever the network condition experience sufficiently great changes.

FIG. 3 illustrates a message flow diagram establishing the multi-party video conferencing.

At step 20, user 12 initiates a video conference call by communicating with the media controller 14.

At step 22, the media controller 14 responds to the initiating user 12 with an ACK.

At step 24, the user 12 provides the media controller 14 with its device information and the watching source IDs.

At step 26, the media controller 14 requests link conditions in the network 10 from the SDN controller 16.

At step 28, the SDN controller responsively polls the Openflow switches 18 for their link conditions.

At step 30, each switch 18 responsively reports its link condition to the SDN controller 16 in a report. Alternatively, each switch 18 may proactively report its link condition to the SDN controller 18 without being polled.

At step 32, the SDN controller 16 sends the ascertained link information to the media controller 14.

At step 34, based on the link conditions and client requested information, the media controller 14 constructs multicast trees and packs them together.

At step 36, the media controller 14 sends an optimized flow rate to each source user 12.

At step 38, the media controller 14 also sends route information to the SDN controller 16.

At step 40, the SDN controller sets flow tables in the switches 18.

At step 42, the user 12 sends video data to the Openflow switches 18.

Work Compatibly with MCU-Based Solution for Large Scale Implementation.

Figure 4:
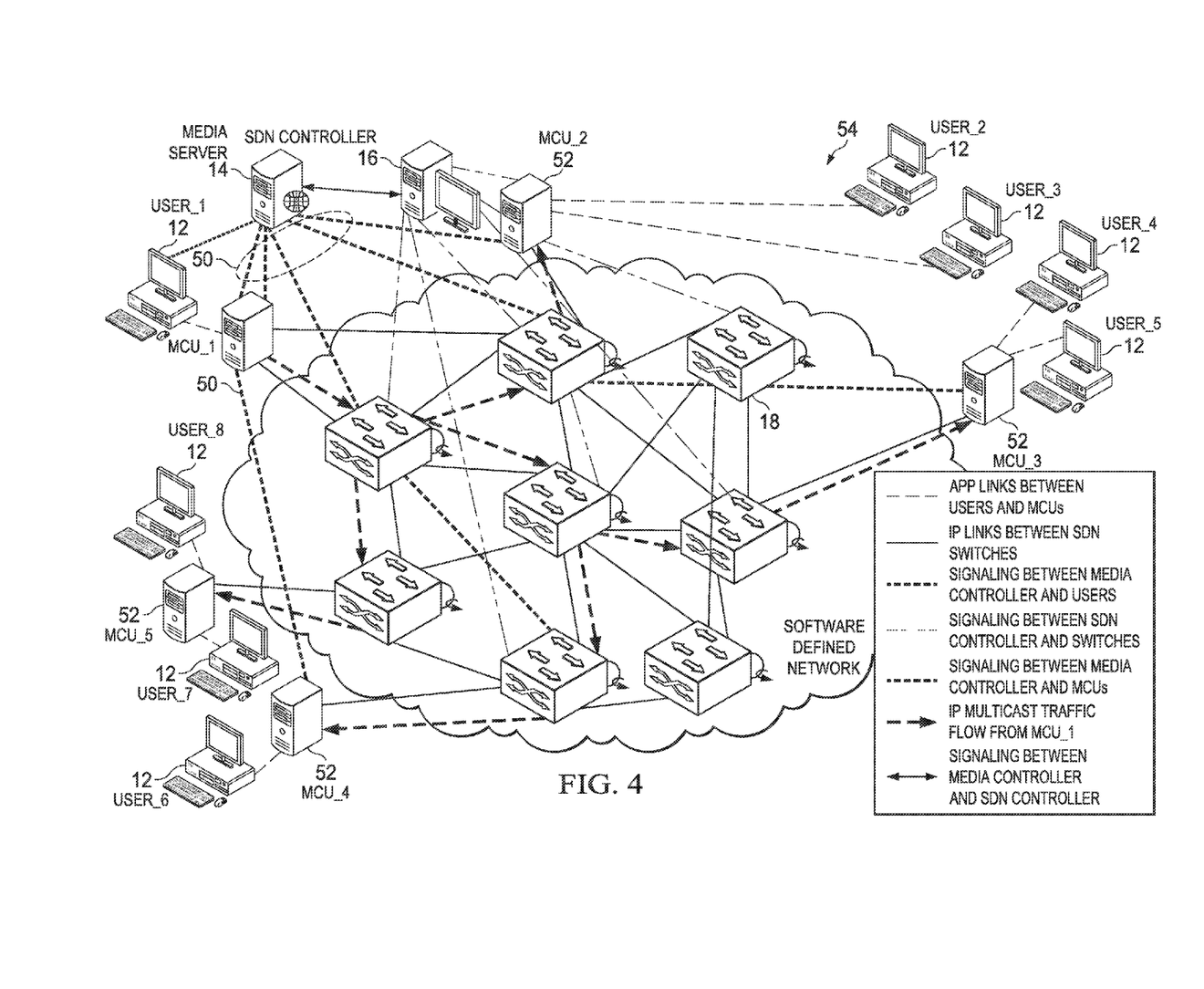
FIG. 4 illustrates a SDN-enabled multicast linking up multiple MCUs for large-scale multi-party video conferencing systems.

For a large-scale implementation of the multi-party video conferencing system, the SDN-enabled multicast network 10 is used working together with the MCU-based solution to achieve better performance, in which SDN-enabled multicast trees 50 interconnect multiple MCUs 52 in a system network 54. The system network 54 is depicted in FIG. 4. When the users 12 intend to initiate a conference call, they first sort to the media controller 14 by sending it requests. The media controller 14 responds to the user 12 requests by assigning MCUs 52 for users 12 to associate with based on the users' location and MCU workload. Each user 12 then sends video packets to its associated MCU 52 along a default route. At the same time, the SDN controller 16 updates with the media controller 14 about the network condition based on its gathered information from switches 18. With the knowledge of link conditions and interaction relationships among MCUs 52, the media controller 14 constructs multicast trees 50 for each MCU 52 and packs them together in order to determine the flow route and video rate for each MCU 52.

Similar to network 10 as discussed, the media controller 14 notifies the MCUs 52 about the sending video rate, and the SDN controller 16 correspondingly sets up the flow tables at each switch 18. Each MCU 54 thereafter forwards the video traffic along the multicast trees 50 to the destined MCUs 52. Each destined MCU 52 finally unicasts the videos to each of the associated receiving users 12 along the default route. If it is necessary, the destined MCU 52 will do the transcoding based on receiving users 12 requests to achieve better rate adaptivity.

SDN-Enabled Multicast Tree Constructing and Packing.

In addition to the network architecture and interfaces, one main problem is how to construct and pack the multicast trees 50 for multiple sources at the same time. The problem is the same for either a small or large scale implementation, with the main difference being that the video sources and receivers are either users or MCUs. An end-user case is used to study the problem.

Problem Description

This section defines the SDN-enabled multicast tree 50 construction and packing problem. Let G={V,E} denote the physical network, where V is the set of network nodes including switches 18 and end users 12, and E is the set of network links between the nodes. Let K be the set of active video sources. For source k, its receivers may be only part of the whole users 12 and $G_k$ is used to represent its receiver set. For each link e, $C_e$ and $D_e$ are used to denote its available link capacity and link delay, respectively. For each source k, the utility of receiver t could be expressed as $U_{k,t}(r_{k,t})$, where $r_{k,t}$ is the received video rate. To make the problem tractable, each source is assumed to employ single-layered video coding and thus $r_{k,t}=r_k$, t∈$G_k$. $U_{k,t}(.)$ is a strictly concave, monotonically increasing and twice differentiable function, which can be expressed in the form of peak-signal-to-noise-ratio (PSNR) model, i.e., $w_{k,t} \log(r_k,t)$, where $w_{k,t}$ is the weight of utility, which reflects the importance of receiver t obtaining the video from source k. Different users 12 may have a different QoE value when watching the same video, like the cases that they may use different devices or some receivers have preferences on some particular video sources. $w_{k,t}$ is used to generally characterize these differences. Correspondingly, the system-wide network utility can be defined as the aggregate of the utility of all receivers, i.e. $U=\Sigma_{k\in K} \Sigma_{t\in Gk} w_{k,t} \log(r_k)$. If $w_k$ is denoted $w_k=\Sigma_{t\in Gk} w_{k,t}$, the network utility can be re-written as $U=\Sigma_{k\in K} w_k \log(r_k)$, where $w_k$ represents the weight of utility of source k. To guarantee the delay performance of the system, it is desirable to maintain all one-way video transmission delay under a threshold, say $D_{th}$. Moreover, the source-based multicast tree approach is employed for tree construction, i.e., a multicast tree is constructed for each source and its destinations. However, this may incur the problem that the aggregate rate may exceed the link capacity on some links overlapped among multiple multicast trees. This requires carrying out some measurements to properly pack those multicast trees together in order to meet the link capacity constraint.

Definition 1:

SDN-enabled multicast tree 50 construction and packing problem (MTCP problem): Given a network G(V,E) with link capacity $C_e$ and link delay $D_e$ for each link e, the upper bound $D_{th}$ for one-way video transmission delay and weight of utility $w_k$ of source k, find (1) the video rate $r_k$ for each source k, and (2) the route for the source-based multicast tree 21 of each source k, such that the system-wide network utility $\Sigma_{k\in K} w_k \log(r_k)$ can be maximized while the end-to-end delay for each source destination pair is maintained under $D_{th}$ and the aggregate flow rate on each link is lower than $C_e$.

B. Multicast Tree Construction and Packing Algorithm

In general, multi-constrained path selection, with or without optimization, is an NP-complete problem that cannot be exactly solved in polynomial time. The above formulated MTCP problem is even more complicated, where the route of multicast trees and video rates for multiple sources need to be jointly determined under delay and link capacity constraints. Therefore, a time-efficient multicast tree construction and packing algorithm solves the problem. The algorithm operates in the following two steps:

In the first step, the link capacity constraint is relaxed to find a delay-bounded multicast tree for each source that supports the possibly largest multicast rate. In other words, for each source, a multicast tree is constructed for it as if it solely occupies the whole network resource, which implies that there may exist some congested links in the network shared by such multiple multicast trees with the aggregate link rate violating the link capacity constraint.

In the second step, for all the congested links, iteratively solve the congestion problem for each link by either rerouting some multicast trees from the congested link or adjusting the video rates to alleviate the working burden of the link.

Before delving into the details of the algorithm, two related works are discussed that are partially utilized in this disclosure. Turgay, et al. studied how to find a minimum cost path from a source node to a destination node while at the same time satisfying K QoS constraints. Turgay, et al. named this problem as a multi-constrained optimal path (MCOP) problem. As this problem is NP-complete, they proposed a heuristic algorithm H_MCOP, which runs Dijkstra's algorithm twice to solve it. Qing, et al. studied how to construct a minimum-cost multicast tree with delay constraints. They proposed a heuristic algorithm named bounded shortest multicast algorithm (BSMA). The algorithm is based on a feasible search optimization method which consists of two steps. In the first step, the minimum-delay steiner tree is constructed with respect to the multicast source by using Dijkstra shortest algorithm. In the second step, the delay-bounded multicast tree is iteratively refined in a monotonous cost reduction. The refinement is accomplished by an operation of path switching. In particular, consider a superedge which is the longest simple path in the multicast tree with all internal nodes (i.e., excluding the end nodes of this path) being relay nodes and each relay node connecting exact two tree edges. To reduce the cost, each time, BSMA deletes the superedge with the highest cost resulting in two subtrees and then finds an alternative delay-bounded path with lower cost to reconnect two subtrees. To get such lower-cost path, BSMA incrementally constructs the k-shortest paths (i.e., smallest cost paths) between the two sub-trees and examines them one by one, which are constructed by consecutively calling Dijkstra's shortest-path algorithm, eliminating already found shortest paths from consideration.

This disclosure utilizes H_MCOP and BSMA algorithms, but with modifications to find the maximum-rate delay-bounded path. First, to achieve a maximum multicast rate for a multicast tree, the optimization objective maximizes the minimum link capacity instead of minimizing the total cost in BSMA. The BSMA is modified to achieve the maximum-rate delay-bounded multicast tree. Second, when finding a path between two nodes, only the delay constraint is considered, which is the special case with K=1 QoS constraint for the H_MCOP algorithm. Third, the BSMA algorithm is modified to construct multicast tree for video source, and the modification mainly falls in how to iteratively refine a multicast tree in rate enhancement. BSMA uses a k-shortest paths algorithm to get a lower cost path, where k is not known as a priori, and is determined only after a delay-bounded shortest path is found. In BSMA, the k-shortest path incremental construction stops either when the newly found shortest path results in the new tree violating the delay bound or the newly found shortest path has the same cost as the one just deleted. Thus, this process may incur very high time complexity.

In this disclosure, to make it time-efficient, the H_MCOP algorithm is used to find the maximum-rate delay-bounded path to replace k-shortest paths algorithm in the original BSMA. The details of the modified BSMA algorithm are shown in Table 1, in which the Dijkstra's algorithm is first used to find a minimum-delay tree spanning the source and all receivers, and then iteratively enhance the link capacity on the tree. For each iteration j, a superedge $p_h$ with the smallest link capacity is selected and removed from the multicast tree, resulting in two subtrees $T^j_k[1]$ and $T^j_k[2]$, and then the H_MCOP algorithm is executed to construct maximum-rate delay-bounded path $p_s$ between two ends of $p_h$, which are used to replace $p_h$ linking up the two subtrees so as to achieve higher multicast rate.

TABLE 1

TABLE 1
MODIFIED BSMA ALROGITHM.

Input:
G = (V, E): network graph;
k: multicast source;
$G_k$: set of receivers of source k;
$C_e$: capacity of link e;
$D_e$: delay of link e;
$D_{th}$: delay bound for receivers;
Output:
$r_k$: multicast rate of video source k;
$T_k$: multicast tree of source k;
Function
$(r_k, T_k)$ = Modified-BSMA (k, $G_k$, $\{C_e\}$, $\{D_e\}$, $D_{th}$)
j = 0;
Construct minimum-delay tree $T^j_k$ spanning $\{k\} \cup G_k$ using Dijkstra's algorithm;
$r_k = \min_{e \in T^j_k} \{C_e\}$;
while (true) do
 $p_h$ = unmarked superedge in $T^j_k$ with the minimum link capacity among all unmarked superedges;
 if ($p_h$ does not exist) break;
 Mark superedge $p_h$;
 Remove $p_h$ from $T^j_k$, getting two subtrees $T^j_k[1]$ and $T^j_k[2]$;
 Derive the delay bound D' for the new path linking up subtrees;
 $p_s$ = H_MCOP(G, k, D', $T^j_k[1]$, $T^j_k[2]$);
 j = j + 1;
 $T^j_k = p_s \cup T^j_k[1] \cup T^j_k[2]$;
 $r_k = \min_{e \in T^j_k} \{C_e\}$;
 if $p_s \neq p_h$ do
  Unmark all marked superedges;
 end if
end while After constructing the maximum-rate delay-bounded multicast tree for each source independently by the modified BSMA algorithm, now, the work left is how to pack those multicast trees together so as to ensure that the aggregate rates on all links do not exceeding the link capacity. Basically, there are two possible choices to solve the conflict: decreasing video rates of some sources, or rerouting the multicast trees of some sources to avoid the congested link. It is worth pointing out that these two measurements will definitely lower, or at most maintain, the network utility since the independently constructed multicast trees already hold the maximum possible rates. However, it is uncertain which measurement would lead to a better result since the necessary rate decreasing is determined by the number of multicast trees commonly shared the congested link and the opportunity of rerouting operation heavily depends on the level of available network resource. Therefore, it is necessary to investigate those two approaches and compare their results at the same time. In the following, the rate decreasing and rerouting work is first described, and then the complete multicast tree construction and packing algorithm is described with the integration of these two approaches.

TABLE 2

Proportional Rate Allocation Function.

Input:
$C_e$: capcity of link e;
$w_k$: weight of utility of source k;
$r_k$: multicast rate of source k before proportional rate allocation;
$T_k$: multicast tree of source k;
Output:
$\tilde{r}_k$: multicast rate of video source k after proportional rate allocation;
$\tilde{U}$: sytem-wide network utility after proportional rate allocation;
Function
$(\tilde{U}, \{\tilde{r}_k\})$ = Proportional-Rate-Alloc (e, $C_e$, $\{w_k\}$, $\{r_k\}$, $\{T_k\}$)
$\{\tilde{r}_k\} = \{r_k\}$;
$\mathcal{T}_e = \{T_k | e \in T_k, \forall T_k \in \{T_k\}\}$;
for all $T_k$ in $\mathcal{T}_e$ $$\tilde{r}_k = \frac{w_k}{\sum_{k \in K} I(e \in T_k) w_k} C_e;$$

end for $$\tilde{U} = \sum_{k \in K} w_k \log(\tilde{r}_k);$$

Consider the objective function $\Sigma_k w_k \log(r_k)$, according to Karush-Kuhn-Tucker (KKT) condition, the rate of each source should be proportionally allocated to get the optimal solution, which means $w_k/r_k$ should be the same for all sources. Therefore, based on this heuristic, when the congestion occurs on a link e, if there is no other available resource to use, the whole link capacity is proportionally allocated to the sources whose multicast trees shared the same link, i.e., $r_k = C_e \cdot w_k / \Sigma_k I(e \in T_k) w_k$ where $I(c) = \{0,1\}$ is an indicator whether the condition c is satisfied or not. This process is described in Table 2. The proportional rate allocation is employed to decrease the video rates so as to alleviate the congestion.

When there is a possibility to use other light-loaded links, some multicast trees away from the congested link are considered. Table 3 describes the rerouting rate allocation algorithm, in which a given number of video sources whose multicast trees are moved away from the congested link and their video rates are re-allocated accordingly.

TABLE 3

TABLE 3
REROUTING RATE ALLOCATION FUNCTION.

Input:
G: network graph;
$C_e$ and $D_e$: capcity and delay of link e;
$w_k$: weight of utility of source k;
$n_e$: number of sources whose multicast trees are considered for rerouting from link e;
$r_k$: multicast rate of video source k before rerouting;
$T_k$: multicast tree of video source k before rerouting;
Output:
$\tilde{r}_k$: multicast rate of video source k after rerouting;
$\tilde{T}_k$: multicast tree of video source k after rerouting;
$\tilde{U}$: sytem-wide network utility after rerouting;
flag: an indicator whether routing $n_e$ flows is sufficiently enough to meet link capacity constraint for link e;
Function
$(\{\tilde{r}_k\}, \{\tilde{T}_k\}, \tilde{U}, \text{flag})$ = Reroute-Rate-Alloc(e, $\{C_e\}$, $\{D_e\}$, $\{w_k\}$, $n_e$, $\{r_k\}$, $\{T_k\}$)
$K_e = \{k | \text{multicast tree of source k contains link e, for all source k}\}$;
Sort source set $K_e$ in increasing order regarding the value of $w_k/r_k$;

TABLE 3-continued

TABLE 3
REROUTING RATE ALLOCATION FUNCTION.

$\{\tilde{r}_k\} = \{r_k\}$ and $\{\tilde{T}_k\} = \{T_k\}$;
for (n = 1; n ≤ $n_e$; n ++) do
    k = $K_e$(n) and consider source k;
    Remove link e from $\tilde{T}_k$ resulting in subtrees $T_k[1]$ and $T_k[2]$;
    Use H_MCOP algorithm in the residual graph $G' = G \setminus \{\tilde{T}_k\}$
    to find a new delay-bounded path linking up $T_k[1]$ and $T_k[2]$;
    if (we could find such new path)
        Update $\tilde{T}_k$ and $\tilde{r}_k$, and remove k from $K_e$;
    end if
end for
if ($\Sigma_{k \in K_e} \tilde{r}_k \leq C_e$) flag = true
else
    flag = false;
    ($\tilde{U}, \{\tilde{r}_k\}$) = Proportional-Rate-Alloc (e, $C_e$, $\{w_k\}$, $\{\tilde{r}_k\}$, $\{\tilde{T}_k\}$);
end if
$\tilde{U} = \Sigma_{k \in K} w_k \log(\tilde{r}_k)$;

In particular, given the congested link e and the total number $n_e$ of links to be rerouted, noting $n_e$ is less than the total number of sources whose multicast trees contain link e, the identity of the $n_e$ sources is first ascertained. Since each source is expected to achieve the same value of $w_k/r_k$, the sources with small values of $w_k/r_k$ are more suitable to be rerouted because rerouting will lower, or at most keep, the original multicast rate obtained by the modified BSMA algorithm. Based on this observation, correspondingly, the sources are first sorted that share the congested link e in the increasing order regarding the value of $w_k/r_k$, and then iteratively reroute $n_e$ sources that hold a smaller value of $w_k/r_k$ compared with others.

In each time, source k with the smallest $w_k/r_k$ is considered that its multicast tree $T_k$ contains link e. The link e is removed from $T_k$, resulting in $T_k$ becoming two subtrees $T_k[1]$ and $T_k[2]$. The delay bound $D^p_{th}$ is derived for the new path linking up the two subtrees. $D^p_{th}=D_{th}-D(T_k[1],h_e)-\max_{t \in Tk[2]} D(T_k[2],t_e,t)$, where $D(T_k[1],h_e)$ represents the delay from source to the head point of link e on subtree $T_k[1]$ and $D(T_k[2],t_e,t)$ stands for the delay between the tail point of link e and receiver t along the path on subtree $T_k[2]$. Finally, the H_MCOP algorithm is used to find a new path to replace link e linking up the two subtrees, which is the maximum-rate delay-bounded path with the delay bound of $D^p_{th}$ in the residual graph $G'=G\setminus\{T_k\}$. This implies that the rerouting operation on $T_k$ would not have an impact on other existing multicast trees. If it is feasible to find such a new path, the video rate of source k and its multicast tree $T_k$ are updated accordingly. After rerouting $n_e$ sources, if the aggregate rate is equal to or smaller than the link capacity, the indicating variable is set as true to reveal that rerouting is sufficiently enough to solve the congestion. Otherwise, the proportional rate allocation algorithm is used to further assign the video rates for the remaining sources using the link.

Figure 5A:
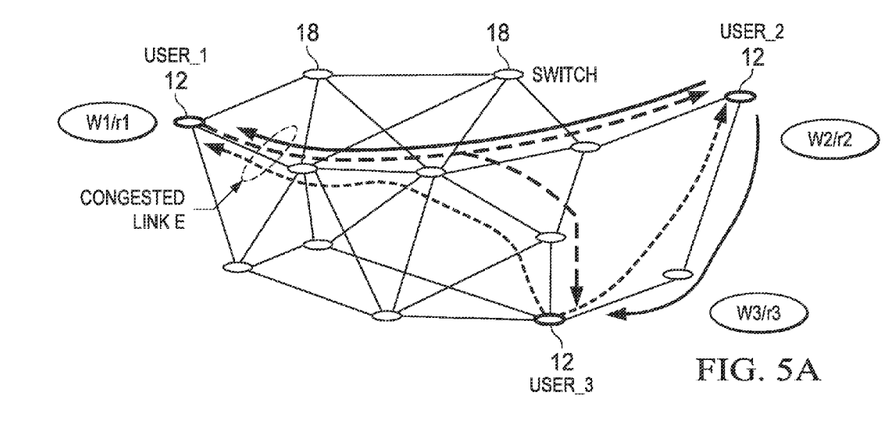
FIGS. 5A and 5B illustrates an example of a rerouting rate allocation.
Figure 5B:
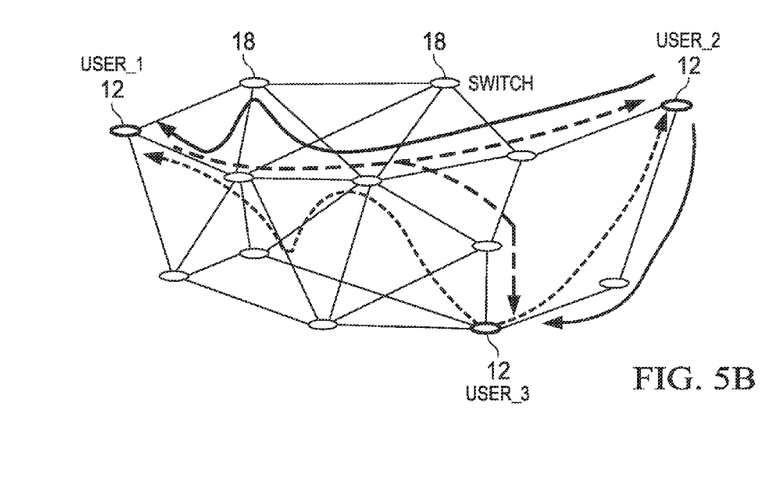

FIGS. 5A and 5B illustrates one example rerouting process according to this disclosure, in which there are three users 12, each user 12 receiving the videos from the other two users. After the sources construct their maximum-rate delay-bounded multicast trees independently, which are shown in dashed, solid and dotted lines with arrows respectively, it is shown that link e is congested as all of the multicast trees go through it. Two sources from link e are rerouted, where $w_3/r_3 < w_2/r_2 < w_1/r_1$. According to the selection principle, user 3 with the smallest value of $w_k/r_1$ is rerouted to another route by H_MCOP in the residual graph $G\setminus\{T_1, T_2, T_3\}$. The multicast tree $T_3$ is then updated and the video rate $r_3$ is set to the minimum link capacity on $T_3$. After rerouting of source 3, user 2, with a smaller value of $w_k/r_k$ compared to user 1, is selected and further rerouted from link e in the same way as user 3.

Table 4 shows the complete details of the multicast tree construction and packing algorithm according to one aspect of this disclosure. In particular, maximum-rate delay-bounded multicast trees are built for each source independently. Thereafter, the congested links are iteratively handled until all the links meet the link capacity constraint. For each congested link, a certain number of sources (from 1 to $N_e-1$) are incrementally rerouted away from the link and the results of rerouting and proportional rate allocation are checked each time in order to choose the one giving larger network utility.

TABLE 4

TABLE 4
MULTICAST TREE CONSTRUCTION AND PACKING ALGORITHM.

Input:
G = (V, E): network graph;
$C_e$ and $D_e$: capacity and delay of link e;
$D_{th}$: delay bound for one-way end-to-end video transmission;
$w_k$: weight of utility of source k;
Output:
$r_k^*$:final multicast rate of video source k
$T_k$: final route of mutlicast tree of video source k
$U^*$: final system-wide network utility
for (each source k) do
    ($r_k, T_k$) = Modified-BSMA (k, $G_k$, $\{C_e\}$, $\{D_e\}$, $D_{th}$);
end for
while (true) do
    $\{Z_e\} = \{\Sigma_{k \in K} I(e \in T_k)r_k - C_e | \forall e \in E\}$;
    e' = arg max$\{Z_e\}$;
    if ($Z_{e'}^e \leq 0$)
        $\{r_k^*\} = \{r_k\}, \{T_k^*\} = \{T_k\}$ and $U^* = \Sigma_{k \in K} w_k \log(r_k^*)$;
        break;
    end if
    ($U^*, \{r^*_k\}$) = Proportional-Rate-Alloc (e', $C_{e'}$, $\{w_k\}$, $\{r_k\}$, $\{T_k\}$);
    $N_e$ = Number of multicast trees that contains link e;
    for ($n_e$ = 1; $n_e < N_e$; $n_e$ ++)
        ($\{\tilde{r}_k\}, \{\tilde{T}_k\}, \tilde{U}$, flag) = Reroute-Rate-Alloc(e, $\{C_e\}$, $\{D_e\}$,
            $\{w_k\}$, $n_e$, $\{r_k\}$, $\{T_k\}$);
        if ($\tilde{U} > U^*$)
            $U^* = \tilde{U}, \{r_k^*\} = \{\tilde{r}_k\}$ and $\{T_k^*\} = \{\tilde{T}_k\}$;
        end if
        if(flag = true) break;
    end for
    $\{r_k\} = \{r_k^*\}$ and $\{T_k\} = \{T_k^*\}$;
end while The complexity of the algorithm can be analyzed as follows. The time cost to build a maximum-rate delay-bounded multicast tree by, the modified BSMA algorithm is $O(|V|^3 \log(|V|))$. For the process of solving the conflict to the link capacity, the handling is cleared with the most congested link that would not make other links more congested. This means that, at most, all the links in the network are examined, i.e., iterate for |E| times, to get the final result. For each congested link, since there are at most WI sources sharing it, 1 source to at most |K| sources are rerouted by using the H_MCOP algorithm to find new paths. H_MCOP is executed with the time complexity of $O(|V|\log |V|+|E|)$ to find a path. By storing the rerouting results of previous sources, solving the congestion for a link results in $|K|(|V|\log|V|+|E|)$ time cost. Therefore, considering link state update in O(E) time, the overall time complexity of the algorithm is $O(|V|^3 \log(|V|)+|K| |E|(|V|\log (|V|)+|E|)+|E|^2)$.

Simulation Results

In this section, we examine the performance of SDN-enable multicast solution and compared it with MCU-based solution.

Given Topology as a Case Study

Figure 6:
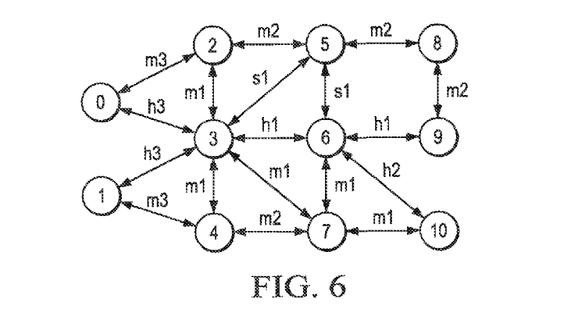
FIG. 6 illustrates a topology of an example network.

First, a simple network topology with 11 nodes (including users and switches) as shown in FIG. 6 is considered as a case study on the performance of the SDN-enabled multicast solution and MCU-based solution. Table 5 depicts the link settings of the topology, and Table 6 shows the video watching relationship in the conferencing system.
Table 5 and 6 7 8

TABLE 5

LINK SETTINGS OF THE EXAMPLE NETWORK.

| Label | Bandwidth (kbps) | Delay (ms) |
|---|---|---|
| S1 | 400 | 50 |
| M1 | 500 | 50 |
| M2 | 500 | 100 |
| M3 | 500 | 150 |
| H1 | 1000 | 50 |
| H2 | 1000 | 100 |
| H3 | 1000 | 150 |

TABLE 6

VIDEO WATCHING RELATIONSHIP.

| Video Source k | Video Receivers $G_k$ | Weight of Utility $w_k$ |
|---|---|---|
| 0 | 6, 9 | 6 |
| 1 | 6, 10 | 8 |
| 6 | 1, 9 | 4 |

TABLE 7

SDN-ENABLED MULTICAST SOLUTION
WITH NETWORK UTILITY OF 104.6.

| Source | Rates (kbps) | Used Link | Delay(ms) | |
|---|---|---|---|---|
| 0 | 500 | (0, 3)(3, 7)(7, 6)(6, 9) | 200 (user 6) | 250 (user 9) |
| 1 | 1000 | (1, 3)(3, 6)(6, 10) | 200 (user 6) | 250 (user 10) |
| 6 | 400 | (6, 9)(3, 1) | 200 (user 1) | 50 (user 9) |

TABLE 8

MCU-BASED solution

| Source | Rates (kbps) | Used Link | Delay(ms) | |
|---|---|---|---|---|
| MCU is located at node 3 with resulted network utility of 99.41. | | | | |
| 0 | 333.33 | (0, 3)(3, 6)(6, 9) | 200 (user 6) | 250 (user 9) |
| 1 | 333.33 | (1, 3)(3, 6)(3, 7)(7, 10) | 200 (user 6) | 250 (user 10) |
| 6 | 333.33 | (6, 3)(3, 1)(3, 6)(6, 9) | 200 (user 1) | 150 (user 9) |
| MCU is located at node 5 with resulted network utility of −7.75. | | | | |
| 0 | 133.33 | (0, 3)(3, 5)(5, 6)(6, 9) | 250 (user 6) | 300 (user 9) |
| 1 | 133.33 | (1, 3)(3, 5)(5, 6)(6, 10) | 250 (user 6) | 350 (user 10) |
| 6 | 133.33 | (6, 5)(5, 3)(3, 1)(5, 6)(6, 9) | 250 (user 1) | 150 (user 9) |

In the MCU-based solution, the video from all sources is first transmitted to the MCU and then forwarded to each receiver, and each flow goes through the shortest path as the default route. The source video rate is determined by the flow rate on the bottleneck link along end-to-end path. When multiple paths share a same link, the link capacity will be equally allocated for each source. To guarantee the visual quality, the end-to-end delay target $D_{th}$ is set to be 300 ms. If the resulted end-to-end delay is larger than $D_{th}$, a penalty $-0.01 \times (D-D_{th})^2$ is added to calculate the utility. The results of the SDN-enabled multicast solution are shown in Table 7 and the results of the MCU-based solution with a MCU located in two different locations (i.e., at node 3 and node 5) is concluded in Table 8.

From these results, it can be seen that users can get better video quality by using SDN-enable multicast with higher video rates since the multicast route is optimized to maximize video rates by SDN control to make it possible to customize the IP/link layer infrastructure for different flows, while the MCU-based solution is a pure application-layer solution and its data routing is always fixed along the default path set by the router/switch. It is also seen that the choices of MCU location severely impact the performance of MCU-based solution. For example, when a MCU is located at node 5, the end-to-end delay between source 1 and receiver 10 has exceeded the set delay bound, which causes the network utility drastically decreased.

Random Network Topologies

Figure 7:
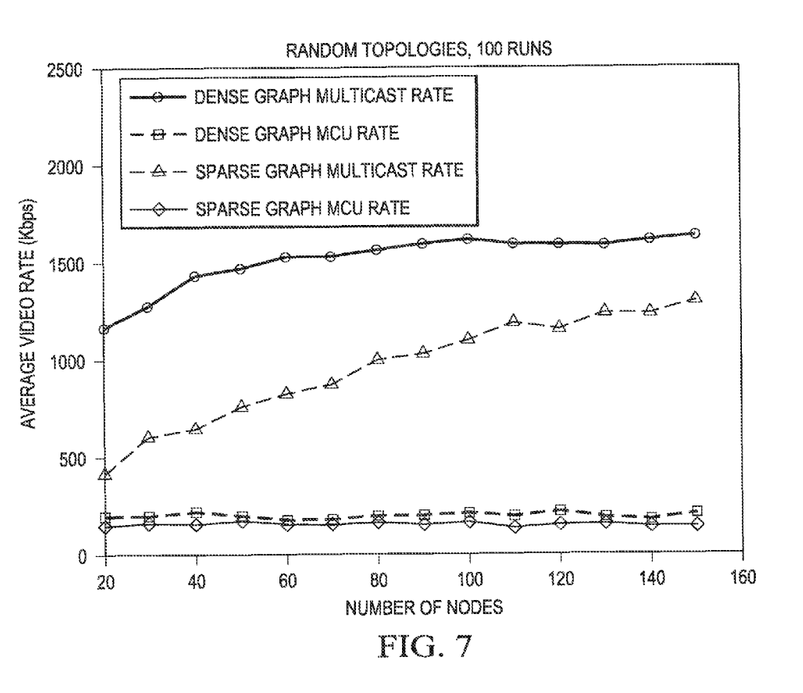
FIG. 7 illustrates average video rate as the function of the number of nodes in the network.
Figure 8:
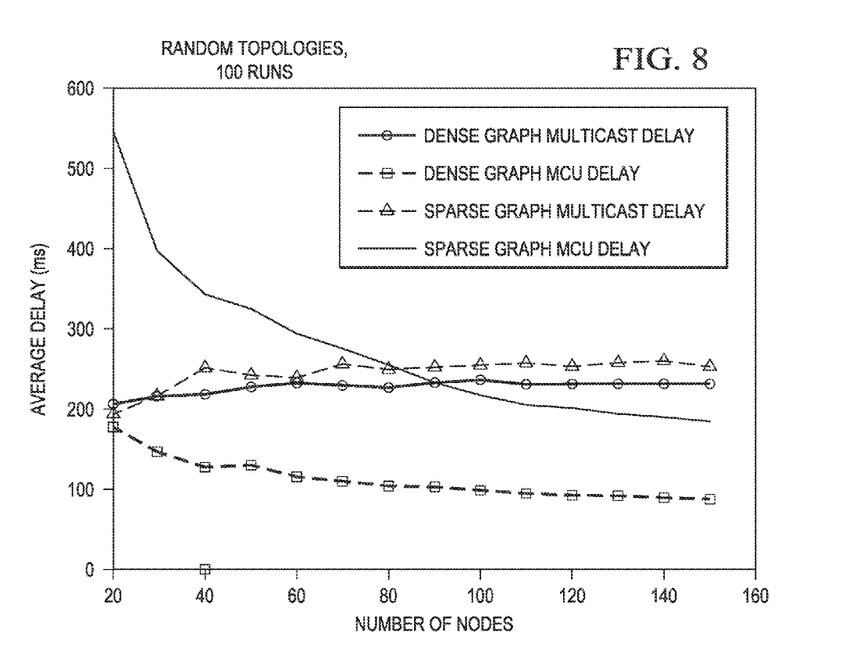
FIG. 8 illustrates average delay as the function of the number of nodes in the network.

In this subsection, random graphs are generated as networks with random topology to compare the performances of the SDN-enabled multicast and the MCU-based solution. Two kinds of graph are considered: dense-graph (DG) and sparse-graph (SG). Assume the number of network nodes is |V|. DG will generate |V|(|V|−1)/4 edges and SG will have |V|(|V|−1)/16 edges. For each link, its bandwidth is randomly chosen between 50 kbps and 2000 kbps and its delay is randomly chosen between 20 ms and 200 ms. The end-to-end delay target is still set to 300 ms. First, the watching relationship is fixed as in Table 6 and the number of nodes varied from 20 to 150. FIG. 7 and FIG. 8 show the average video rate across all sources and the average delay of all paths between all sources and receivers, respectively. Each point of results in these figures is the average of 100 simulations. It is evident that the cases in DG always outperform those running in SG. This is reasonable, since DG has more diversified links for use, which can more effectively balance the traffic flows. And as the number of nodes increases, the video rate of multicast solution would obviously increase, however, the video rate of MCU-based solution only shows slight variations. This validates the fact that this disclosure can adaptively and fully utilize the growth of network resource, and the server-based approach behaves almost ignorantly to those changes. Even worse, the delay performance of MCU-based solution may be very poor in some cases. For instance, when a sparse network has only 20 nodes, the end-to-end delay could go up to more than 500 ms.

Figure 9:
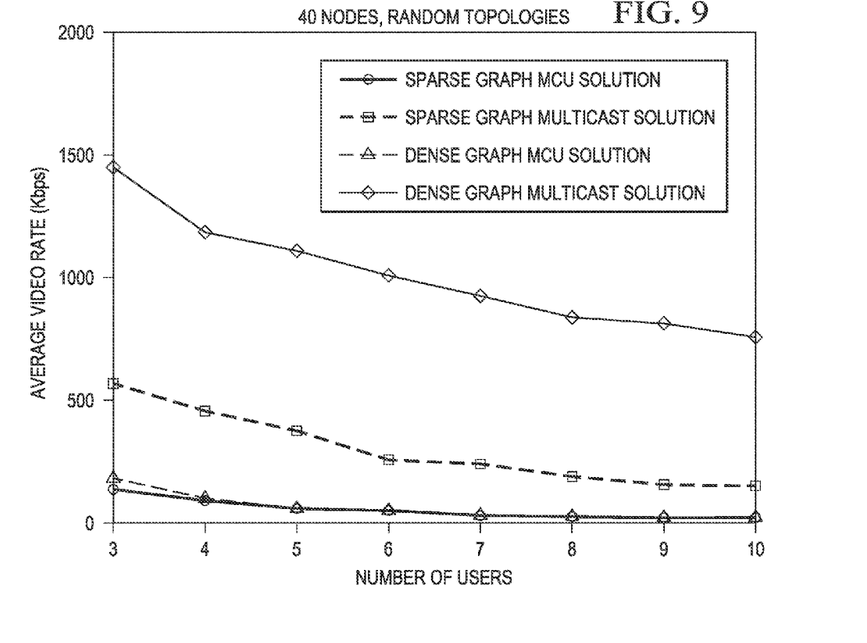
FIG. 9 illustrates average video rate as the function of the number of users in the network.
Figure 10:
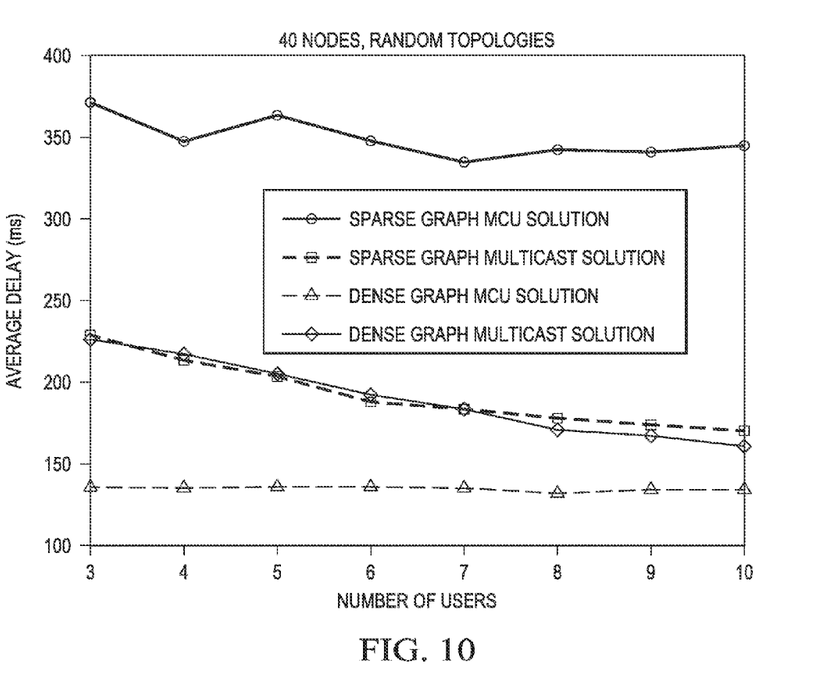
FIG. 10 illustrates average delay as the function of the number of users in the network.

Next, the node number in the graph is fixed to 40 and the source number is varied from 3 to 10 with each one intending to watch the video from all the others. Focusing on the average rate and the average delay, the results are shown in FIG. 9 and FIG. 10, respectively. For each point in the figure, it is still the average of 100 runs. It is shown in the figures, as the competing source number increases, that the average video rate of both solutions under investigation would gradually decrease. It is also noticed that the average delay of the SDN-enabled multicast solution is a little bit higher than the MCU-based solution. This is because the present disclosure tries to balance the tradeoff between rate and delay in an optimized way, where video rate is maximized at the expense of slight higher delay while still keeping it under the delay bound. As the network becomes sparsely distributed, the MCU-based solution is unable to ensure the delay performance, which always violates the delay constraint.

In this disclosure, using SDN-enabled multicast facilitates multi-party video conferencing application. A multicast tree construction and packing algorithm feasibly realizes the system, which maximize network utility while ensuring the bounded delay between all sources and destinations. Simulation results demonstrate that SDN-enable multicast solution can surpass MCU-based solution in both sparsely and densely distributed networks.

Figure 11:
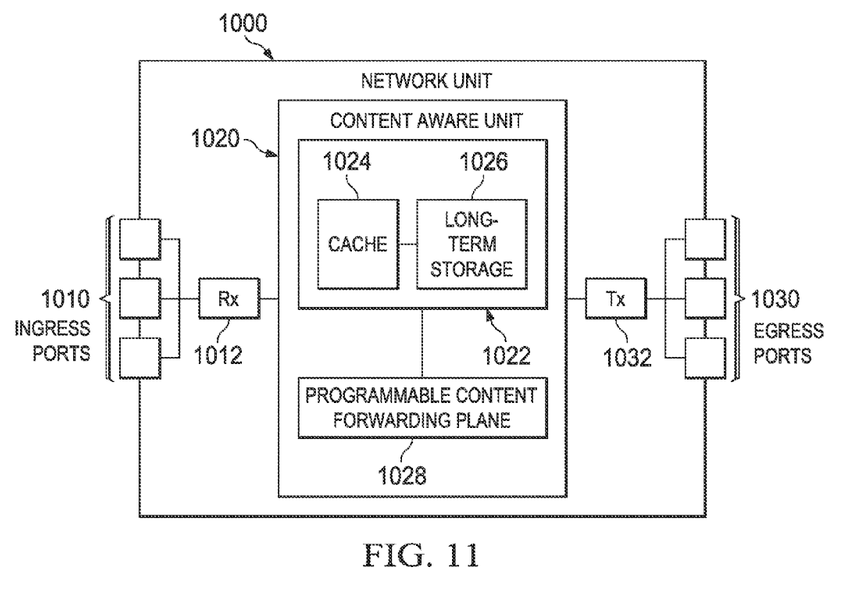
FIG. 11 illustrates a diagram of a network unit which may be any device that transports and processes data through the network.

FIG. 11 illustrates an embodiment of a network unit 1000, which may be any device that transports and processes data through network 100, including the Interest packet and the Data packet including the PDU according to the present disclosure. For instance, the network unit 1000 may correspond to or may be located in any of the system nodes described above, such as a MN, PoA, content router R/edge router ER, local controller LC, and AS. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 11.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 12:
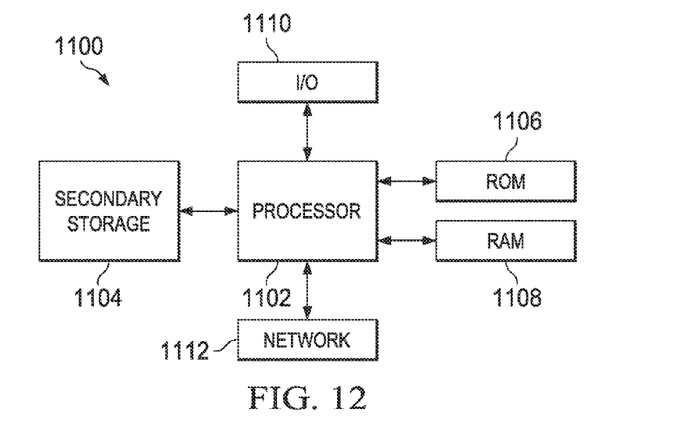
FIG. 12 illustrates a diagram of network components.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of multicast video telephony, the method comprising:
   receiving, at a media controller, video conference request from each of a plurality of client devices;
   receiving, at the media controller, network information from a network controller;

generating, by the media controller, a video sending rate for each of the plurality of client devices, wherein the video sending rate is based on the received video conference request and the received network information, wherein generating the video sending rate comprises independently constructing a delay-bounded multicast tree for each of the plurality of client devices that supports a maximum multicast rate to form multicast trees;
determining a common congested link in the multicast trees; and
re-routing a multicast tree with the common congested link for a client device with a lowest weight of utility divided by its video sending rate and creating two subtrees.

2. The method of claim 1, wherein the network controller is a software defined networking (SDN) controller.

3. The method of claim 1, wherein generating the video sending rate comprises:
determining, at the media controller, the delay-bounded multicast tree for each of the plurality of client devices.

4. The method of claim 1, further comprising re-routing the multicast tree with the common congested link for the client device with the next lowest weight of utility divided by its video sending rate.

5. The method of claim 4, further comprising iteratively re-routing the multicast trees with the common congested link until an aggregate video sending rate of the multicast trees sharing the common congested link meets a link capacity of the common congested link.

6. The method of claim 5, further comprising finding another link to replace the common congested link on the multicast trees such that a delay of each multicast tree is still below a predetermined threshold.

7. A media controller configured to support multicast video telephony, configured to:
receive video conference request from each of a plurality of client devices;
receive network information from a network controller;
generate a video sending rate for each of the plurality of client devices, wherein the video sending rate is based on the received video conference request and the received network information;
independently construct a delay-bounded multicast tree for each of the plurality of client devices that supports a maximum multicast rate to form multicast trees;
determine a common congested link in the multicast trees; and
re-route a multicast tree with the common congested link for a client device with a lowest weight of utility divided by its video sending rate and create two subtrees.

8. The media controller of claim 7 wherein the network controller comprises a software defined networking (SDN) controller.

9. The media controller of claim 7, wherein the media controller is configured to determine the delay-bounded multicast tree for each of the plurality of client devices.

10. The media controller of claim 7, wherein the media controller is configured to:
re-route the multicast tree with the common congested link for the client device with the next lowest weight of utility divided by its video sending rate.

11. The media controller of claim 10, wherein the media controller is configured to iteratively re-route the multicast trees with the common congested link until an aggregate video sending rate of the multicast trees sharing the common congested link meets a link capacity of the common congested link.

12. The media controller of claim 11, wherein the media controller is configured to find another link to replace the common congested link on the multicast trees such that a delay of each multicast tree is still below a predetermined threshold.

13. A system configured to enable multicast video telephony, comprising:
a network controller configured to provide network information; and
a media controller configured to:
receive a video conference request from each of a plurality of client devices;
receive network information from the network controller;
generate a video sending rate for each of the plurality of client devices, wherein the video sending rate is based on the received video conference request and the received network information;
independently construct a delay-bounded multicast tree for each of the plurality of client devices that supports a maximum multicast rate to form multicast trees;
determine a common congested link in the multicast trees; and
re-route a multicast tree with the common congested link for a client device with a lowest weight of utility divided by its video sending rate and create two subtrees.

14. The system of claim 13, wherein the media controller is configured to determine the delay-bounded multicast tree for each of the plurality of client devices.

* * * * *